US010866314B2

(12) United States Patent
Skoglund et al.

(10) Patent No.: US 10,866,314 B2
(45) Date of Patent: Dec. 15, 2020

(54) ULTRASOUND TESTING

(71) Applicant: DolphiTech AS, Gjøvik (NO)

(72) Inventors: Eskil Skoglund, Gjøvik (NO);
Arnt-Børre Salberg, Hamar (NO)

(73) Assignee: DolphiTech AS, Gjøvik (NO)

(*) Notice: Subject to any disclaimer, the term of this patent is extended or adjusted under 35 U.S.C. 154(b) by 412 days.

(21) Appl. No.: 15/856,658

(22) Filed: Dec. 28, 2017

(65) Prior Publication Data
US 2018/0120425 A1 May 3, 2018

Related U.S. Application Data

(62) Division of application No. 14/071,199, filed on Nov. 4, 2013, now abandoned.

(30) Foreign Application Priority Data

Aug. 13, 2013 (GB) .................................. 1314483.7

(51) Int. Cl.
H04B 17/00 (2015.01)
G01S 7/523 (2006.01)
(Continued)

(52) U.S. Cl.
CPC ............ *G01S 7/523* (2013.01); *G01N 29/069* (2013.01); *G01N 29/07* (2013.01); *G01N 29/226* (2013.01);
(Continued)

(58) Field of Classification Search
None
See application file for complete search history.

(56) References Cited

U.S. PATENT DOCUMENTS 2,804,614 A 8/1957 Alvarez
3,454,922 A * 7/1969 Dory .................... G01F 23/2962
367/97
(Continued)

FOREIGN PATENT DOCUMENTS

CN 102599929 A 7/2012
CN 102680583 9/2012
(Continued)

OTHER PUBLICATIONS

Zejak, Boris U., Igor S. Simic, and Aleksa J. Zejak. "Matched and mismatched pulse compression in medical ultrasound imaging." EUROCON'2001. International Conference on Trends in Communications. Technical Program, Proceedings (Cat. No. 01EX439). vol. 2. IEEE, 2001. (Year: 2001).*
(Continued)

Primary Examiner — James R Hulka
Assistant Examiner — Jonathan D Armstrong
(74) Attorney, Agent, or Firm — Fish & Richardson P.C.

(57) ABSTRACT

An apparatus for imaging structural features below the surface of an object, the apparatus comprising: a transmitter unit configured to transmit a sound pulse at the object; a receiver unit configured to receive reflections of sound pulses transmitted by the transmitter unit from the object; a signal processing unit configured to: analyse one or more signals received by the receiver unit from the object; recognise, in the one or more signals, a reflection that was caused by a first structural feature and a reflection that was caused by a second structural feature that is located, in the object, at least partly behind the first structural feature; and associate each recognised reflection with a relative depth in the object at which the reflection occurred; and an image generation unit configured to generate an image that includes a representation of the first and second structural (Continued)

Absolute value of the match filtered ultrasound signal. The upper arrow indicates the amplitude of the main lobe, and the lower arrow indicates the amplitude of the side lobe features in dependence on the recognised reflections and their relative depths.

18 Claims, 11 Drawing Sheets

(51) Int. Cl.
    *G01N 29/06* (2006.01)
    *G01N 29/07* (2006.01)
    *G01N 29/22* (2006.01)
    *G01S 7/524* (2006.01)
    *G01S 7/526* (2006.01)
    *G01S 15/02* (2006.01)

(52) U.S. Cl.
    CPC .............. *G01S 7/524* (2013.01); *G01S 7/526* (2013.01); *G01S 15/02* (2013.01); *G01N 2291/044* (2013.01)

(56) References Cited

U.S. PATENT DOCUMENTS

| | | | |
|---|---|---|---|
| 3,723,952 A | 3/1973 | Walsh | |
| 3,778,756 A | 12/1973 | Houston | |
| 3,895,525 A | 7/1975 | Eichelberger et al. | |
| 4,159,462 A | 6/1979 | Rocha | |
| 4,169,257 A * | 9/1979 | Smith | G01S 3/8055 367/123 |
| 4,325,257 A | 4/1982 | Kino | |
| 4,441,369 A | 4/1984 | Lessard et al. | |
| 4,910,717 A * | 3/1990 | Terry | G01S 7/52006 367/910 |
| 5,235,985 A | 8/1993 | McMorrow | |
| 5,383,366 A | 1/1995 | Wallingford et al. | |
| 5,396,890 A | 3/1995 | Weng | |
| 5,497,661 A | 3/1996 | Stripf | |
| 5,630,208 A * | 5/1997 | Enge | H04B 1/711 375/232 |
| 5,773,811 A | 6/1998 | Schramm, Jr. et al. | |
| 6,099,472 A | 8/2000 | Fukukita | |
| 6,245,016 B1 * | 6/2001 | Daft | G01S 7/52026 600/443 |
| 6,748,259 B1 | 6/2004 | Benaron | |
| 7,675,045 B1 | 3/2010 | Werner | |
| 8,453,928 B2 | 6/2013 | Melandsø et al. | |
| 9,470,662 B2 | 10/2016 | Baarstad et al. | |
| 2002/0062083 A1 | 5/2002 | Ohara et al. | |
| 2002/0130807 A1 | 9/2002 | Hall | |
| 2002/0198455 A1 * | 12/2002 | Ossmann | G10K 11/348 600/459 |
| 2003/0145655 A1 | 8/2003 | Lorraine et al. | |
| 2003/0158479 A1 * | 8/2003 | Li | G01S 7/52046 600/437 |
| 2005/0279171 A1 | 12/2005 | Kollgaard | |
| 2006/0126434 A1 | 6/2006 | Intrator | |
| 2006/0219013 A1 | 10/2006 | Baba et al. | |
| 2007/0053795 A1 | 3/2007 | Laugharn | |
| 2007/0084290 A1 | 4/2007 | Fetzer et al. | |
| 2008/0000299 A1 | 1/2008 | Georgeson | |
| 2008/0009739 A1 | 1/2008 | Chiang | |
| 2008/0208061 A1 | 8/2008 | Halmann | |
| 2009/0082673 A1 | 3/2009 | Lu et al. | |
| 2010/0274139 A1 | 10/2010 | Fukukita et al. | |
| 2011/0019154 A1 * | 1/2011 | Jennings | F41G 7/002 353/11 |
| 2011/0040187 A1 | 2/2011 | Matsumura | |
| 2011/0253787 A1 * | 10/2011 | Melands? | G06K 7/02 235/439 |
| 2012/0192651 A1 | 8/2012 | Lee et al. | |
| 2013/0030727 A1 | 1/2013 | Zalameda et al. | |
| 2015/0049579 A1 | 2/2015 | Skoglund et al. | |
| 2015/0049580 A1 | 2/2015 | Skoglund et al. | |
| 2015/0053013 A1 | 2/2015 | Baarstad et al. | |
| 2015/0078129 A1 | 3/2015 | Skoglund et al. | |

FOREIGN PATENT DOCUMENTS

| | | | |
|---|---|---|---|
| CN | 104656074 A | 5/2015 | |
| DE | 20213105252 | 4/2014 | |
| EP | 1621135 | 11/2006 | |
| EP | 2151698 A1 * | 2/2010 | ............ G01S 13/88 |
| EP | 2249152 | 11/2010 | |
| GB | 2109555 | 6/1983 | |
| GB | 2286678 | 8/1995 | |
| GB | 2432671 | 5/2007 | |
| JP | 60-102553 | 6/1985 | |
| JP | 60-102554 | 6/1985 | |
| JP | 08-075714 | 3/1996 | |
| JP | 2006284241 A | 10/2006 | |
| JP | 2010060520 A | 3/2010 | |
| WO | WO2008/137030 | 11/2008 | |
| WO | WO2011/089537 | 7/2011 | |
| WO | WO2013/161834 | 10/2013 | |

OTHER PUBLICATIONS

Nguyen, Thanh D., Stanley J. Reeves, and T. S. Denney. "Optimal pulse shape for estimating positions of superimposed pulses." IEEE transactions on signal processing 47.1 (1999): 210-212. (Year: 1999).*
Watson, Charles C. "An evaluation of image noise variance for time-of-flight PET." IEEE Transactions on Nuclear Science 54.5 (2007): 1639-1647. (Year: 2007).*
EP Examination Report for corresponding Appl No. 14185307.7, dated Mar. 8, 2018.
Zhenggan Zhou et al: "Application of Pulse Compression Technique in Air-Coupled Ultrasonic Non-Destructive Testing on Composite Material", Proceedings of the 10th European Conference on Nondestructive Testing, Jun. 7, 2010 (Jun. 7, 2010), pp. 1-6, XP055454765, Abingdon.
S.N. Narouze (ed.), Atlas of Ultrasound-Guided Procedures in Interventional Pain Management, 13 DOI 10.1007/978-1-4419-1681-5 2, Chapter 2 Basics of Ultrasound Imaging Vincent Chan and Anahi Ferias, © Springer Science+Business Media, LLC 2011. (Year: 2011).
UK Intellectual Property Office, Search Report, Application No. GB1413618.8, dated Jan. 27, 2015, 2 pages.
UK Intellectual Property Office, Search Report, Application No. GB1413616.2, dated Jan. 28, 2015, 2 pages.
UK Intellectual Property Office, Search Report, Application No. GB1315090.9, dated Jan. 30, 2015, 2 pages.
Cincotti et al.: "Efficient transmit beamforming in pulse-echo ultrasonic imaging", IEEE Transactions on Ultrasonics, Ferroelectrics and Frequency Control, IEEE, US, vol. 46, No. 6, Nov. 1, 1999, pp. 1450-1458, XP011438016.
Endrerud, Jan Olav; Skoglund, Eskil: "DolphiCam User Manual", Jun. 27, 2013, XP055179749, Raufoss, Noway, http://www.dolphitech.com/wp-content/uploads/2014/12/DolphiCam-User-Manual-1.1-27.06.2013.pdf.
European Extended Search Report issued in EP application No. 14185307.7 dated Apr. 20, 2015, 7 pages.
Gustafsson, M. G., et al., "Split Spectrum Algorithms Rely on Instantaneous Phase Information—A Geometrical Approach," IEEE Transactions on Ultrasonics, Ferroelectrics, and Frequency Control, vol. 40, No. 6, Nov. 1993, pp. 659-665.
Niblack, Wayne, "Digital Image Processing," 1986 Prentice-Hall International, 217 pages.
Persson et al.: "Electric excitation of ultrasound transducers for short pulse generation", Ultrasound in Medicine and Bioligy, New York, NY, US, vol. 7, No. 3, Jan. 1, 1981, pp. 285-289, 291, XP026374039.
Rubbers, Philippe, et al., "An Overview of Split Spectrum Processing," NDT.net Aug. 2003, vol. 8, No. 8, http://www.ndt.net/article/v08n08/rubbers.htm, 10 pages.
Stoica, Petre, et al., "Transmit Codes and Receive Filters for Radar," IEEE Signal Processing Magazine, Nov. 2008, pp. 94-109.

(56) References Cited

OTHER PUBLICATIONS

Tian, Qi, et al., "Multiple Target Detection Using Split Spectrum Processing and Group Delay Moving Entropy," IEEE Transactions on Ultrasonics, Ferroelectrics, and Frequency Control, vol. 42, No. 6, Nov. 1995, pp. 1076-1086.

Tomasi, C., et al., "Bilateral Filtering for Gray and Color Images," Proceedings of the 1998 IEEE International Conference on Computer Vision, Bombay, India, 8 pages.

Data Presentation. (Jun. 25, 2003). Retrieved Jan. 19, 2016, from http://www.nde-ed.org/EducationResources/CommunityCollege/Ultrasonics/EquipmentTrans/DataPres.htm.

Olympus NDT. EPOCH 1000 Series User's Manual. 910-269-EN—Revision B Jun. 2011.

Ultrasound and Ultrasonic Testing. (May 19, 2003). Retrieved Jan. 19, 2016, from http://www.nde-ed.org/EducationResources/HighSchool/Sound/ubrasol.ncl.htm.

[online] 1 Introduction to DolphiCam, Published on Aug. 7, 2013 by DolphiTech, to be accessed online at <https://www.youtube.com/watch?v=uPZnT78L_PE> Feb. 16, 2016.

[online] 2 Unboxing, Published on Aug. 7, 2013 by DolphiTech, to be accessed online at <https://www.youtube.com/watch?v=wcvStX941B0> Feb. 16, 2016.

[online] 3 The Camera, Published on Aug. 7, 2013, by DolphiTech, to be accessed online at <https://www.youtube.com/watch?v=-G9aJkBdegM> Feb. 16, 2016.

[online] 4 Getting Started, Published on Aug. 7, 2013 by DolphiTech, to be accessed online at <https://www.youtube.com/watch?v=x_hhrKvGPgk> Feb. 16, 2016.

[online] 5 Calibrating and Scanning, Published on Aug. 7, 2013 by DolphiTech, to be accessed online at <https://www.youtube.com/watch?v=jNNrN5C-Gz4> Feb. 16, 2016.

[online] 6 Scanning Boreholes, Published on Aug. 7, 2013 by DolphiTech, to be accessed online at < https://www.youtube.com/watch?v=FUd0SGe9UDg> Feb. 16, 2016.

[online] 7 Scanning Impact Damages, Published on Aug. 7, 2013 by DolphiTech, to be accessed.online at < https://www.youtube.com/watch?v=iI2bDgwL4Yg> Feb. 16, 2016.

[online] 8 3D Visualization, Published on Aug. 7, 2013 by DolphiTech, to be accessed online at <https://www.youtube.com/watch?v=TGcKxyAq_p0> Feb. 16, 2016.

[online] 9 Caring for the Camera, Published on Aug. 7, 2013 by DolphiTech, to be accessed online at < https://www.youtube.com/watch?v=LdgmJX9SS0E> Feb. 16, 2016.

Jorg, K-W., and Markus Berg. "First results in eliminating crosstalk and noise by applying pseudo-random sequences to mobile robot sonar sensing." Advanced Mobile Robot, 1996., Proceedings of the First Euromicro Workshop on. IEEE, 1996.

Regalado, Waldo J. Perez, Andriy M. Chertov, and Roman Gr Maev. "Time of Flight Measurements in Real-Time Ultrasound Signatures of Aluminum Spot Welds: An Image Processing Approach." (2011).

Hartfield, Cheryl D., and Thomas M. Moore. "Acoustic Microscopy of Semiconductor Packages." Microelectronics Failure Analysis Desk Reference 5 (2004): 268-288.

Whitman, John, et al. "Autonomous surgical robotics using 3-D ultrasound guidance: Feasibility study." Ultrasonic imaging 29.4 (2007): 213-219.

Ellingson, William A., J. Scott Steckenrider, and Thomas J. Meitzler. "Defect detection in ceramic armor using phased array ultrasound." Advances in Science and Technology. vol. 65. Trans Tech Publications, 2010.

Zejak, Boris U., Igor S. Simic, and Aleksa J. Zejak. "Matched and mismatched pulse compression in medical ultrasound imaging." EUROCON'2001, Trends in Communications, Internationa Conference on vol. 2. IEEE, 2001.

E.A.Ginzel & R.K.Ginzel. Ultrasonic Properties of a New Low Attenuation Dry Couplant Elastomer. NDTnet—Feb. 1996, vol. 1 No. 02. E.A. Ginzel, Materials Research Institute.

* cited by examiner

Typical signal pulse

Match filter corresponding to the pulse in Figure 1.
The filter coefficients are in power-of-two form.

Absolute value of the match filtered ultrasound signal. The upper arrow indicates the amplitude of the main lobe, and the lower arrow indicates the amplitude of the side lobe

ULTRASOUND TESTING

CROSS-REFERENCE TO RELATED APPLICATIONS

The present application is a divisional of, and claims benefit under 35 USC 120 to, U.S. application Ser. No. 14/071,199, filed Nov. 4, 2013, which claims priority to United Kingdom Patent Application No. 1314483.7 entitled Ultrasound Testing, which was filed on Aug. 13, 2013. The disclosure of these application are incorporated herein by reference in their entirety.

BACKGROUND

This invention relates to an apparatus for imaging structural features below an object's surface. The apparatus may be particularly useful for imaging sub-surface material defects such as delamination, debonding and flaking.

Ultrasound is an oscillating sound pressure wave that can be used to detect objects and measure distances. A transmitted sound wave is reflected and refracted as it encounters materials with different acoustic impedance properties. If these reflections and refractions are detected and analysed, the resulting data can be used to describe the environment through which the sound wave travelled.

Ultrasound may be used to detect and decode machine-readable matrix symbols. Matrix symbols can be directly marked onto a component by making a readable, durable mark on its surface. Commonly this is achieved by making what is in essence a controlled defect on the component's surface, e.g. by using a laser or dot-peening. Matrix symbols can be difficult to read optically and often get covered by a coating like paint over time. The matrix symbols do, however, often have different acoustic impedance properties from the surrounding substrate. U.S. Pat. No. 5,773,811 describes an ultrasound imaging system for reading matrix symbols that can be used to image an object at a specific depth. A disadvantage of this system is that the raster scanner has to be physically moved across the surface of the component to read the matrix symbols. U.S. Pat. No. 8,453,928 describes an alternative system that uses a matrix array to read the reflected ultrasound signals so that the matrix symbol can be read while holding the transducer stationary on the component's surface.

Ultrasound can also be used to identify other structural features in an object. For example, ultrasound may be used for non-destructive testing by detecting the size and position of flaws in an object. The ultrasound imaging system of U.S. Pat. No. 5,773,811 is described as being suitable for identifying material flaws in the course of non-destructive inspection procedures. The system is predominantly intended for imaging matrix symbols so it is designed to look for a "surface" below any layers of paint or other coating on which the matrix symbols have been marked. It is therefore designed to operate at specific depths, which can be controlled by gating the received signal. The ultrasound system of U.S. Pat. No. 5,773,811 also uses a gel pack to couple ultrasound energy into the substrate, which may make it difficult to accurately determine the depth of features below the substrate's surface.

SUMMARY

There is a need for an improved apparatus for imaging structural features below the surface of an object.

According to a first embodiment of the present invention there is provided an apparatus for imaging structural features below the surface of an object, the apparatus comprising a transmitter unit configured to transmit a sound pulse at the object, a receiver unit configured to receive reflections of sound pulses transmitted by the transmitter unit from the object, a signal processing unit configured to: analyse one or more signals received by the receiver unit from the object; recognise, in the one or more signals, a reflection that was caused by a first structural feature and a reflection that was caused by a second structural feature that is located, in the object, at least partly behind the first structural feature; and associate each recognised reflection with a relative depth in the object at which the reflection occurred, and an image generation unit configured to generate an image that includes a representation of the first and second structural features in dependence on the recognised reflections and their relative depths.

The receiver unit may be configured to receive a signal comprising multiple reflections of a single transmitted sound pulse.

The receiver unit may configured to receive the multiple reflections while in a stationary position with respect to the object.

The apparatus may be configured to gate a signal received by the receiver unit in such a way that the signal passed to the signal processing unit for analysis comprises the multiple reflections.

The apparatus may be configured to apply an adjustable time-gate to the received signal.

The apparatus may be configured such that the time-gate is adjustable by a user.

The apparatus may comprise a pulse generation unit configured to form a pulse having a particular shape for transmission as a sound pulse by the transmitter unit.

The signal processor may comprise a match filter configured to recognise a pulse having the particular shape in the received signal.

The apparatus may have a plurality of particular pulse shapes available to it, the pulse generation unit may be configured to assess an available pulse shape against a performance criterion and select that pulse shape as a candidate for transmission in dependence on that assessment.

The apparatus may be configured such that the particular shape is selectable by the user.

The signal processor may be configured to associate each recognised reflection with a relative depth that is determined in dependence on a time that the recognised reflection took to travel from the structural feature that caused the reflection to the receiver unit.

The signal processor may be configured to associate each recognised reflection with a maximum amplitude and to adjust that maximum amplitude in dependence on the relative depth associated with that reflection.

The transmitter unit may be configured to transmit a series of sound pulses into the object and the image generation unit being configured to generate an image, for each sound pulse in the series, in dependence on the reflections of that sound pulse that are recognised by the signal processing unit.

The image generation apparatus may be configured to generate an image, for a sound pulse in the series, in dependence an image generated for a sound pulse that preceded it in the series.

The image generation apparatus may be configured to generate an image in which the first and second structural features are represented at positions in the image that reflect their relative depths below the surface of the object.

The apparatus may comprise a handheld device that comprises at least the transmitter and receiver units.

The apparatus may comprise either an integrated display for displaying the image or may be configured to output the image to a handheld display device.

The image generation unit may be configured to identify a reflection having a maximum amplitude that is below a threshold value and assign a pixel in the image that corresponds to the identified reflection a predetermined value instead of the reflection's maximum amplitude.

The image generation unit may be configured to assign the pixel a predetermined value that is higher than the reflection's maximum amplitude.

The apparatus may comprise a dry coupling medium.

The apparatus may comprise a matrix array for transmitting and receiving sound pulses.

According to a second embodiment of the invention, there is provided a method for imaging structural features below the surface of an object comprising: transmitting a sound pulse at the object; receiving, from the object, reflections of sound pulses transmitted at the object; recognising, in one or more signals received from the object, a reflection of a transmitted time pulse that was caused by a first structural feature and a reflection of a transmitted time pulse that was caused by a second structural feature that is located, in the object, at least partly behind the first structural feature; associating each recognised reflection with a relative depth in the object at which the reflection occurred; and generating an image that includes a representation of the first and second structural features in dependence on the recognised reflections and their relative depths.

DESCRIPTION OF DRAWINGS

The present invention will now be described by way of example with reference to the accompanying drawings. In the drawings.

DETAILED DESCRIPTION

Figure 1:
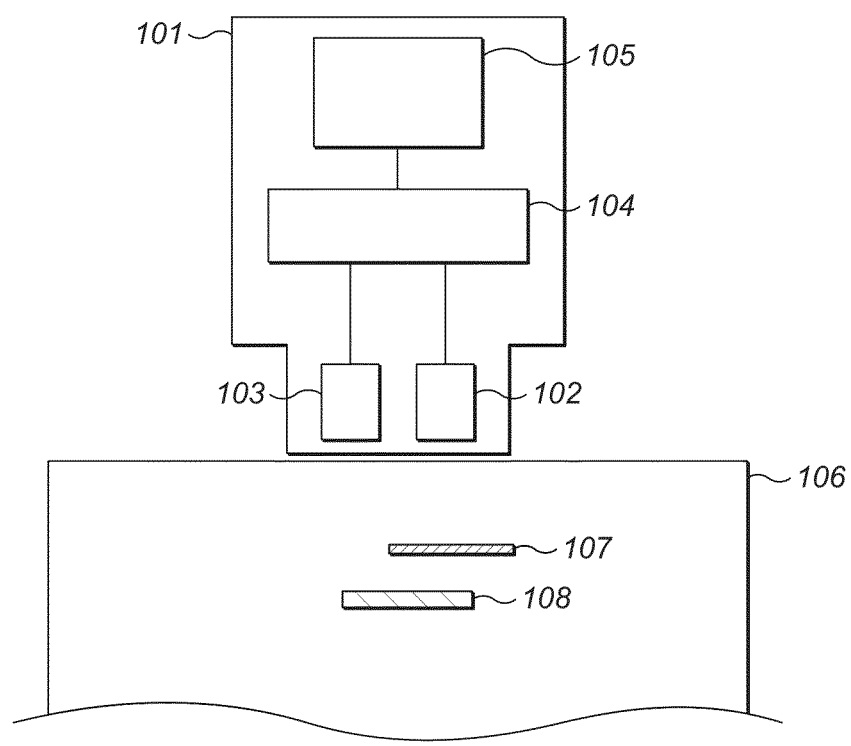
FIG. 1 shows an example of an imaging apparatus and an object.

An apparatus for imaging structural features below the surface of an object is shown in FIG. 1. The apparatus, shown generally at 101, comprises a transmitter unit 102, a receiver unit 103, a signal processing unit 104 and an image generation unit 105. In one example the transmitter and receiver unit may be implemented by a single ultrasound transducer. The transmitter and receiver units are shown next to each other in FIG. 1 for ease of illustration only. In a practical realisation of a transducer it is likely that the transmitter and receiver units will be implemented as layers one on top of the other. The transmitter unit is suitably configured to transmit a sound pulse having a particular shape at the object to be imaged 106. The receiver unit is suitably configured to receive reflections of transmitted sound pulses from the object.

Figure 2A:
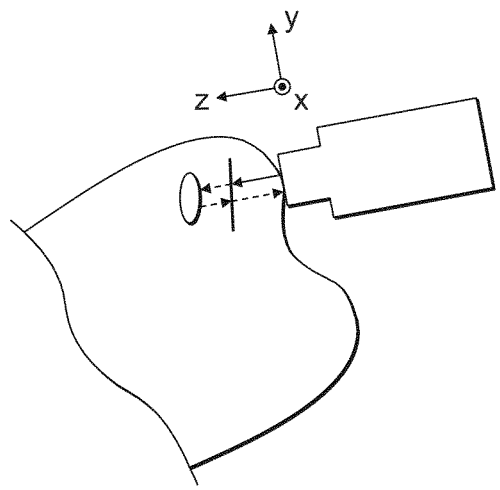
FIGS. 2a to c show different examples of an imaging apparatus and an object.
Figure 2B:
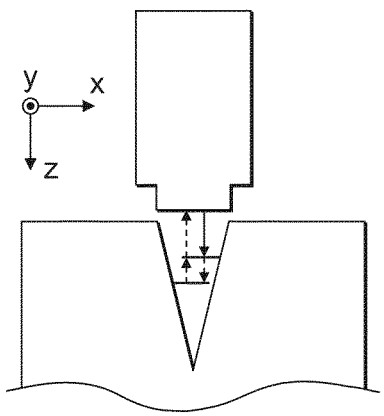
Figure 2C:
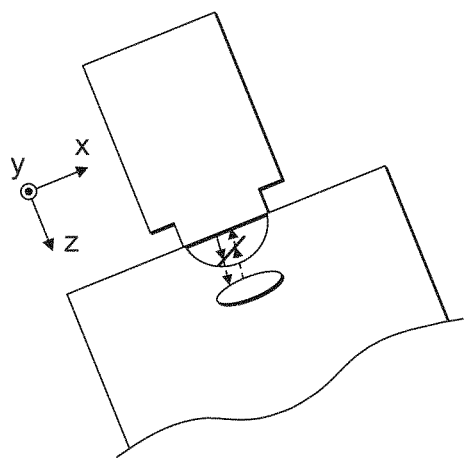

There are two sub-surface structural features 107, 108 in the object. One of the structural features 108 is located partly behind the other feature 107. Generally, the second structural feature is located farther along the path of the transmitted pulse than the first structural feature. Another way of looking at it is that both features lie on a straight line normal to a plane that contacts the object's surface; the second structural feature 108 is located farther along the straight line from the plane than the first structural feature 107. Example scenarios are illustrated in FIGS. 2a to c. In these examples the apparatus has a flat base which can be considered to approximate the "plane", and the sound pulses are transmitted in a direction normal to that surface, so their path can be considered to approximate the "straight line". (In practice, the base of the apparatus need not be flat, nor are the pulses necessarily transmitted in a direction normal to the base of the apparatus, but it is a useful comparison for visualising the arrangement).

FIGS. 2a to c also include examples in which the structural features are not necessarily contained within the solid body of the object. The features could be contained within a hole, depression or other hollow section. Such features are considered to be "in" the object and "below" its surface for the purposes of this description because they lie on the path of the sound pulses as they travel from the apparatus through the object. This model of reflection and propagation is most likely to occur in solid sections of the object for two reasons: (i) ultrasound is attenuated strongly by air; and (ii) air-object boundaries tend to show a big impedance mismatch, so that majority of ultrasound encountering such a boundary will be reflected.

Structural features that are located behind other features are generally "invisible" to existing imaging systems. Signal processing unit 104, however, is configured to recognise reflections caused by both structural feature 107 and 108 in the signals received by receiver unit 103. The signal processing unit is also configured to associate each recognised reflection with a relative depth, which represents the depth in the object at which the reflection occurred, i.e. the depth of the structural feature that caused the reflection. This information enables image generation unit 105 to generate an image that represents both the first and second structural features. The image may be displayed for an operator, enabling sub-surface features to be detected and evaluated. This enables the operator to see "into" the object and can provide valuable information on sub-surface material defects such as delamination, debonding and flaking.

There are a number of ways in which the apparatus may be configured to identify reflections from structural features that are obscured by other features closer to the surface. One option is to use different transmitted sound pulses to gather information on each structural feature. These sound pulses might be different from each other because they are transmitted at different time instants and/or because they have different shapes or frequency characteristics. The sound pulses might be transmitted at the same location on the object's surface or at different locations. This may be achieved by moving the apparatus to a different location or by activating a different transmitter in the apparatus. If changing location alters the transmission path sufficiently a sound pulse might avoid the structural feature that, at a different location, had been obscuring a feature located farther into the object. Another option is to use the same transmitted sound pulse to gather information on the different structural features. This option uses different reflections of the same pulse and is described in more detail below. The apparatus may implement any or all of the options described above and may combine data gathered using any of these options to generate a sub-surface image of the object. The image may be updated and improved on a frame-by-frame basis as more information is gathered on the sub-surface structural features.

In one embodiment the apparatus uses the same transmitted sound pulse to gather information on structural features that are positioned one on top of the other in the object.

The sound pulse suitably has a particular shape and is transmitted by the transmitter unit. The signal received by the receiver unit will typically include a number of reflections of the transmitted sound pulse. These reflections are caused by features of the material structure below the object's surface. Reflections are caused by impedance mismatches between different layers of the object, e.g. a material boundary at the join of two layers of a laminated structure. Often only part of the transmitted pulse will be reflected and a remainder will continue to propagate through the object (as shown in FIGS. 2a to c). The remainder may then be wholly or partly reflected as it encounters other features in the material structure.

The signal received by the receiver unit at a single location on the object's surface is likely to contain two or more successive reflections of the same transmitted pulse. Each reflection represents a different structural feature. Pre-existing imaging devices tend to discard these later reflections because they are not of interest. An apparatus for capturing matrix codes, for example, will typically only be interested one reflection: the reflection off the matrix symbol. When detecting sub-surface defects, it is preferable to capture multiple reflections of the same transmitted pulse; this enables surface defects located below other structural features in the object to be identified.

The signal processing unit is suitably configured to analyse the received signal to find sections of the signal that represent reflections or echoes of the transmitted pulse. The pulses preferably have a known shape so that the signal processor is able to identify their reflections. The signal processing unit is suitably configured to recognise two or more reflections of a single transmitted pulse in the received signal. The signal processing unit is also configured to associate each reflected pulse with a relative depth, which could be, for example, the depth of the structural feature relative to transmitter and/or receiver, the depth of the structural feature relative the surface of the object, or the depth of the feature relative to another structural feature in the object. Normally the relative depth will be determined from the time-of-flight of the reflection (i.e. the time the reflection took to return to the apparatus) and so it represents the distance between the structural feature and the receive unit.

Figure 3:
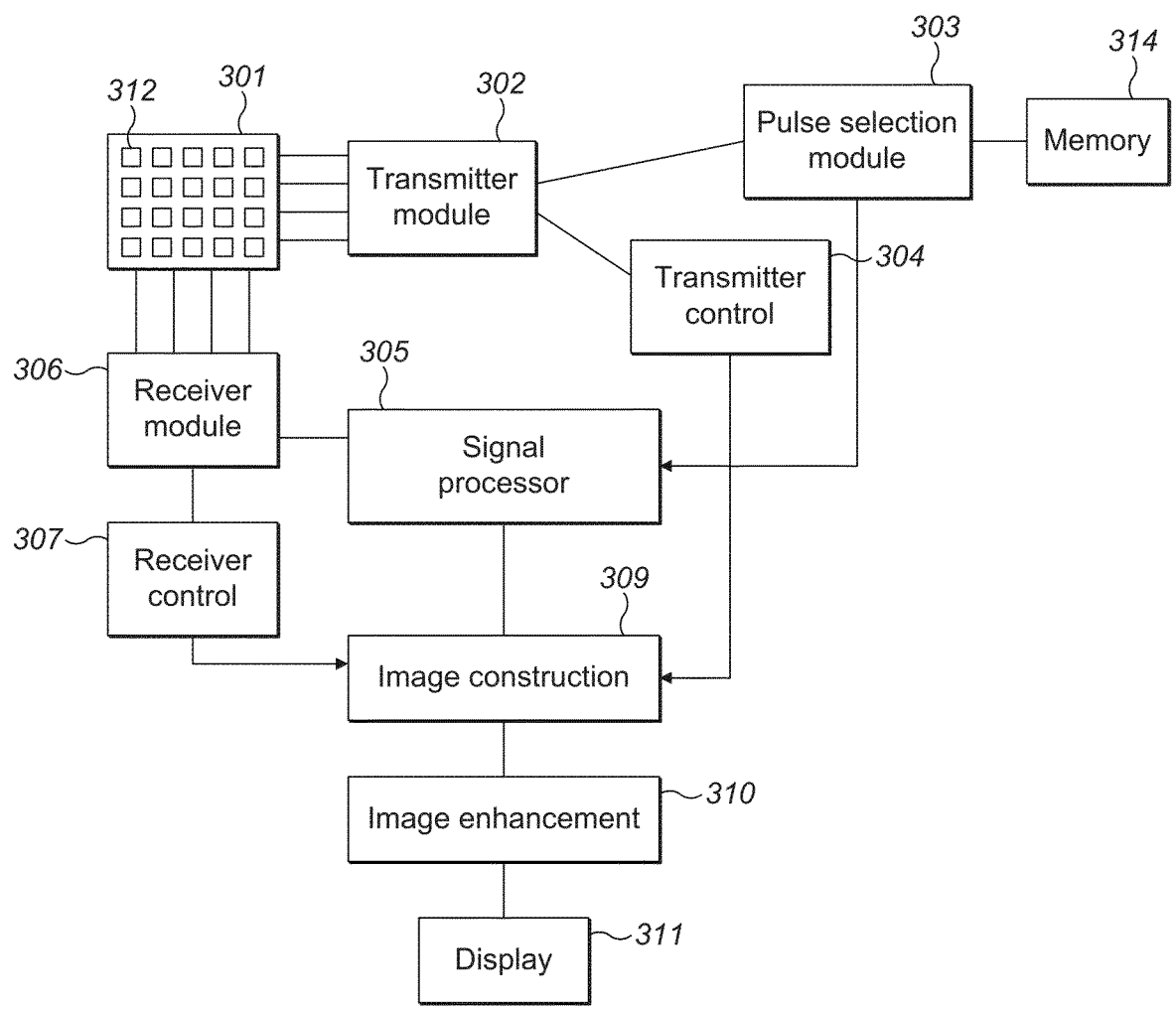
FIG. 3 shows an example of the functional blocks comprised in an imaging apparatus.

An example of the functional blocks comprised in one embodiment of the apparatus are shown in FIG. 3.

In this example the transmitter and receiver are implemented by an ultrasound transducer 301, which comprises a matrix array of transducer elements 312. The transducer elements transmit and/or receive ultrasound waves. The matrix array may comprise a number of parallel, elongated electrodes arranged in an intersecting pattern; the intersections form the transducer elements. The transmitter electrodes are connected to the transmitter module 302, which supplies a pulse pattern with a particular shape to a particular electrode. The transmitter control 304 selects the transmitter electrodes to be activated. The number of transmitter electrodes that are activated at a given time instant may be varied. The transmitter electrodes may be activated in turn, either individually or in groups. Suitably the transmitter control causes the transmitter electrodes to transmit a series of sound pulses into the object, enabling the generated image to be continuously updated. The transmitter electrodes may also be controlled to transmit the pulses using a particular frequency. The frequency may be between 100 kHz and 30 MHz, preferably it is between 1 and 15 MHz and most preferably it is between 2 and 10 MHz.

The receiver electrodes sense sound waves that are emitted from the object. These sound waves are reflections of the sound pulses that were transmitted into the object. The receiver module receives and amplifies these signals. The signals are sampled by an analogue-to-digital converter. The receiver control suitably controls the receiver electrodes to receive after the transmitter electrodes have transmitted. The apparatus may alternately transmit and receive. In one embodiment the electrodes may be capable of both transmitting and receiving, in which case the receiver and transmitter controls will switch the electrodes between their transmit and receive states. There is preferably some delay between the sound pulses being transmitted and their reflections being received at the apparatus. The apparatus may include a dry coupling layer to provide the delay needed for the electrodes to be switched from transmitting to receiving. Any delay may be compensated for when the relative depths are calculated. The dry coupling layer preferably provides low damping of the transmitted sound waves.

Each transducer element may correspond to a pixel in the image. In other words, each pixel may represent the signal received at one of the transducer elements. This need not be a one-to-one correspondence. A single transducer element may correspond to more than one pixel and vice-versa. Each image may represent the signals received from one pulse. It should be understood that "one" pulse will usually be transmitted by many different transducer elements. These versions of the "one" pulse might also be transmitted at different times, e.g. the matrix array could configured to activate a "wave" of transducer elements by activating each line of the array in turn. This collection of transmitted pulses can still considered to represent "one" pulse, however, as it is the reflections of that pulse that are used to generate a single image of the sample. The same is true of every pulse in a series of pulses used to generate a video stream of images of the sample.

The pulse selection module 303 selects the particular pulse shape to be transmitted. It may comprise a pulse generator 313, which supplies the transmitter module with an electronic pulse pattern that will be converted into ultrasonic pulses by the transducer. The pulse selection module may have access to a plurality of predefined pulse shapes stored in memory 314. The pulse selection module may select the pulse shape to be transmitted automatically or based on user input. The shape of the pulse may be selected in dependence on the type of structural feature being imaged, its depth, material type etc. In general the pulse shape should be selected to optimise the information that can be gathered by the signal processor 305 and/or improved by the image enhancement module 310 in order to provide the operator with a quality image of the object.

Figure 4A:
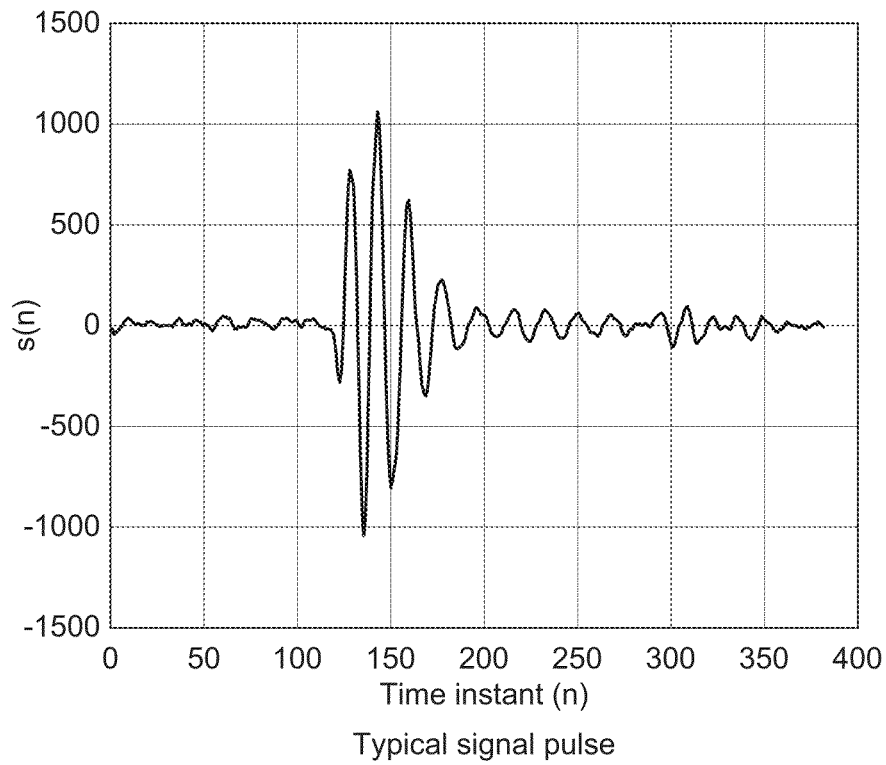
FIGS. 4a to c show examples of an ultrasound signal and a corresponding match filter.
Figure 4B:
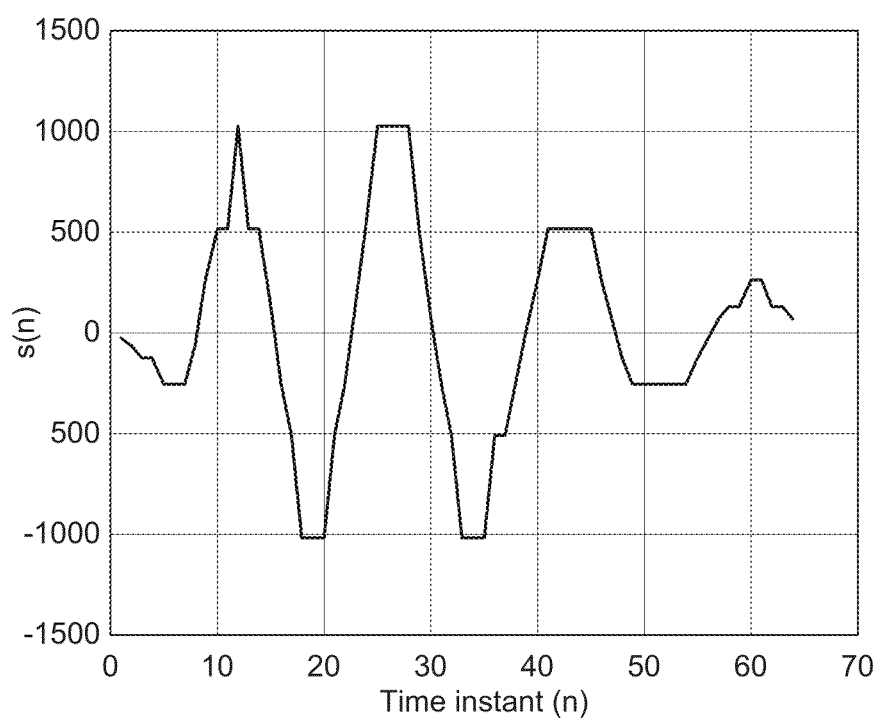

In one example a match filter that the signal processor uses to recognise reflections of a transmitted pulse may be selected to correspond to the selected pulse shape. Examples of an ultrasound signal $s(n)$ and a corresponding match filter p(n) are shown in FIGS. 4a and b respectively. The ultrasound signal s(n) is a reflection of a transmitted pulse against air.

Figure 4C:
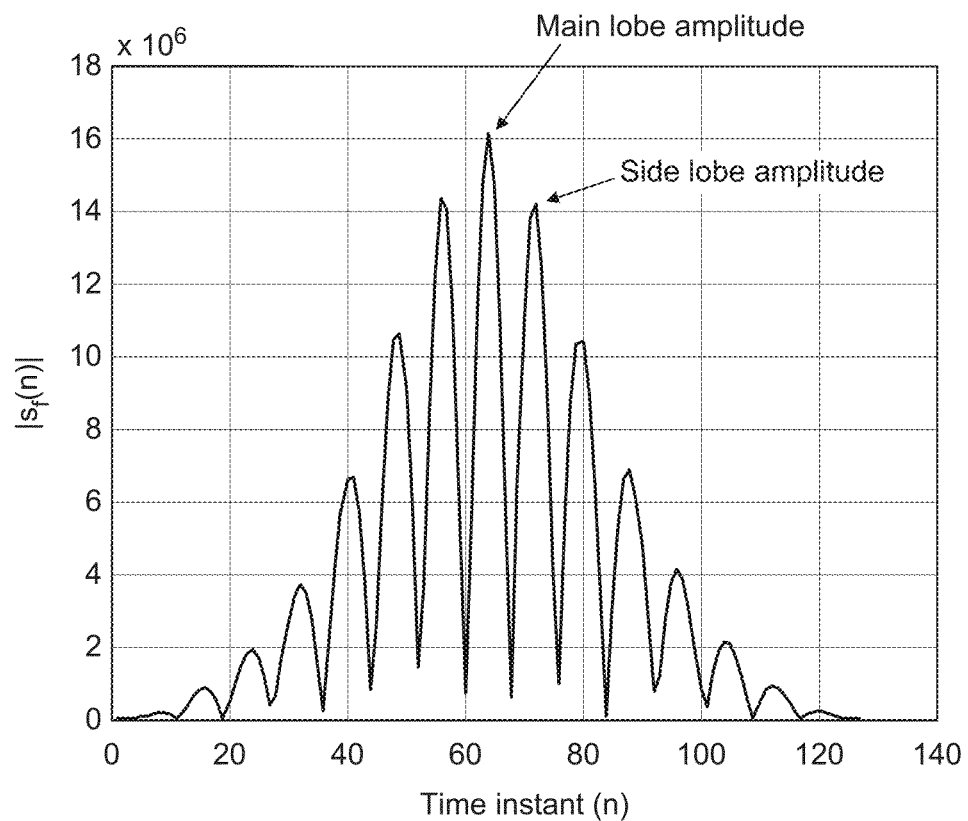

The aim is to select a pulse shape and corresponding match filter that will achieve a precise estimate of the time-of-flight of the reflected pulse, as this indicates the depth of the structural feature that reflected the pulse. The absolute values of the filtered time series (i.e. the absolute of the output of the match-filter) for ultrasound signal s(n) and corresponding match filter p(n) are shown in FIG. 4c. The signal processor estimates the time-of-flight as the time instant where the amplitude of the filtered time series is at a maximum. In this example, the time-of-flight estimate is at time instant 64. If the signal contains a lot of noise, however, this may cause other time instants to produce a higher value. The ideal output of the filter, to obtain the most precise time-of-flight estimate, would be a delta function with all samples having zero-amplitude apart from that at time instant 64 (for this case). Since this is not realisable in practice, the aim is to select pulse shapes and match filters to achieve a good margin between the amplitude of the main lobe and the amplitude of any side lobes.

The apparatus may determine an optimum pulse shape by obtaining a reflection of each transmitted pulse against a particular material (which in one example may be air), filtering it using the appropriate matched filter and determining how the different pulse shapes performed according to the following criteria:

- The ratio between the main lobe and side lobe amplitudes (see FIG. 4c). This criterion does not consider the signal to noise ratio (SNR) and does risk selecting pulse shapes that could be lost in noise at the receiver.
- The difference between the main lobe and side lobe amplitudes, normalized with root-mean-square (RMS) of the matched filter coefficients. This criterion may penalize signals with a low SNR.
- The SNR, i.e. the amplitude of the main lobe divided RMS of the filter coefficients.
- The bandwidth of the signal. This criterion is founded on the fact that the filtered output of signals tends to approach a delta-function as the bandwidth increases. The bandwidth is calculated using the derivative of a smoothing spline approximation of the ultrasound signal.
- The variance of the estimated time-of-flight. This is directly related to the signal bandwidth.
- The main lobe amplitude divided by the average amplitude of all side lobes. This criterion also risk of selecting pulse shapes with a low SNR.

The operator may be able to choose between pulse shapes that are determined to be optimum by the apparatus.

The signal processor is configured to extract relevant information from the received ultrasound signals. The signal is suitably time-gated so that the signal processor only processes reflections from depths of interest. The time-gating may be adjustable, preferably by a user, so that the operator can focus on the depths he is interested in. The depth range is preferably 0 to 20 mm, and most preferably 0 to 15 mm.

The signal processor is preferably capable of recognising multiple peaks in each received signal. It may determine that a reflection has been received every time that the output of the match filter exceeds a predetermined threshold. It may identify a maximum amplitude for each acknowledged reflection.

In some embodiments the apparatus may be configured to accumulate and average a number of successive samples in the incoming sample (e.g. 2 to 4) for smoothing and noise reduction before the filtering is performed. The signal processor is configured to filter the received signals using a match filter, as described above, to accurately determine when the reflected sound pulse was received at the apparatus. The signal processor then performs features extraction to capture the maximum amplitude of the filtered signal and the time at which that maximum amplitude occurs. The signal processor may also extract phase and energy information.

In one embodiment the apparatus may amplify the filtered signal before extracting the maximum amplitude and time-of-flight values. This may be done by the signal processor. The amplification steps might also be controlled by a different processor or FPGA. In one example the time corrected gain is an analogue amplification. This may compensate for any reduction in amplitude that is caused by the reflected pulse's journey back to the receiver. One way of doing this is to apply a time-corrected gain to each of the maximum amplitudes. The amplitude with which a sound pulse is reflected by a material is dependent on the qualities of that material (for example, its acoustic impedance). Time-corrected gain can (at least partly) restore the maximum amplitudes to the value they would have had when the pulse was actually reflected. The resulting image should then more accurately reflect the material properties of the structural feature that reflected the pulse. The resulting image should also more accurately reflect any differences between the material properties of the structural features in the object. The signal processor may be configured to adjust the filtered signal by a factor that is dependent on its time-of-flight.

The image construction module may construct a number of different images of the object using the information gathered by the signal processor. Any of the features extracted by the signal processor from the received signal may be used to generate an image. Typically the images represent the depth associated with a reflection received at a given point on the object's surface and the energy or amplitude of that reflection. Since the signal processor can identify multiple reflections of a given sound pulse at a particular point on the object's surface, the image will show sub-surface structural features located immediately below one another from the operator's perspective. The image construction module may associate each pixel in an image with a particular location on the receiver surface, so that each pixel represents a reflection that was received at the pixel's associated location.

The image construction module may be able to generate an image from the information gathered using a single transmitted pulse. The image construction module may update that image with information gathered from successive pulses. The image construction module may generate a frame by averaging the information for that frame with one or more previous frames so as to reduce spurious noise. This may be done by calculating the mean of the relevant values that form the image.

Figure 5A:
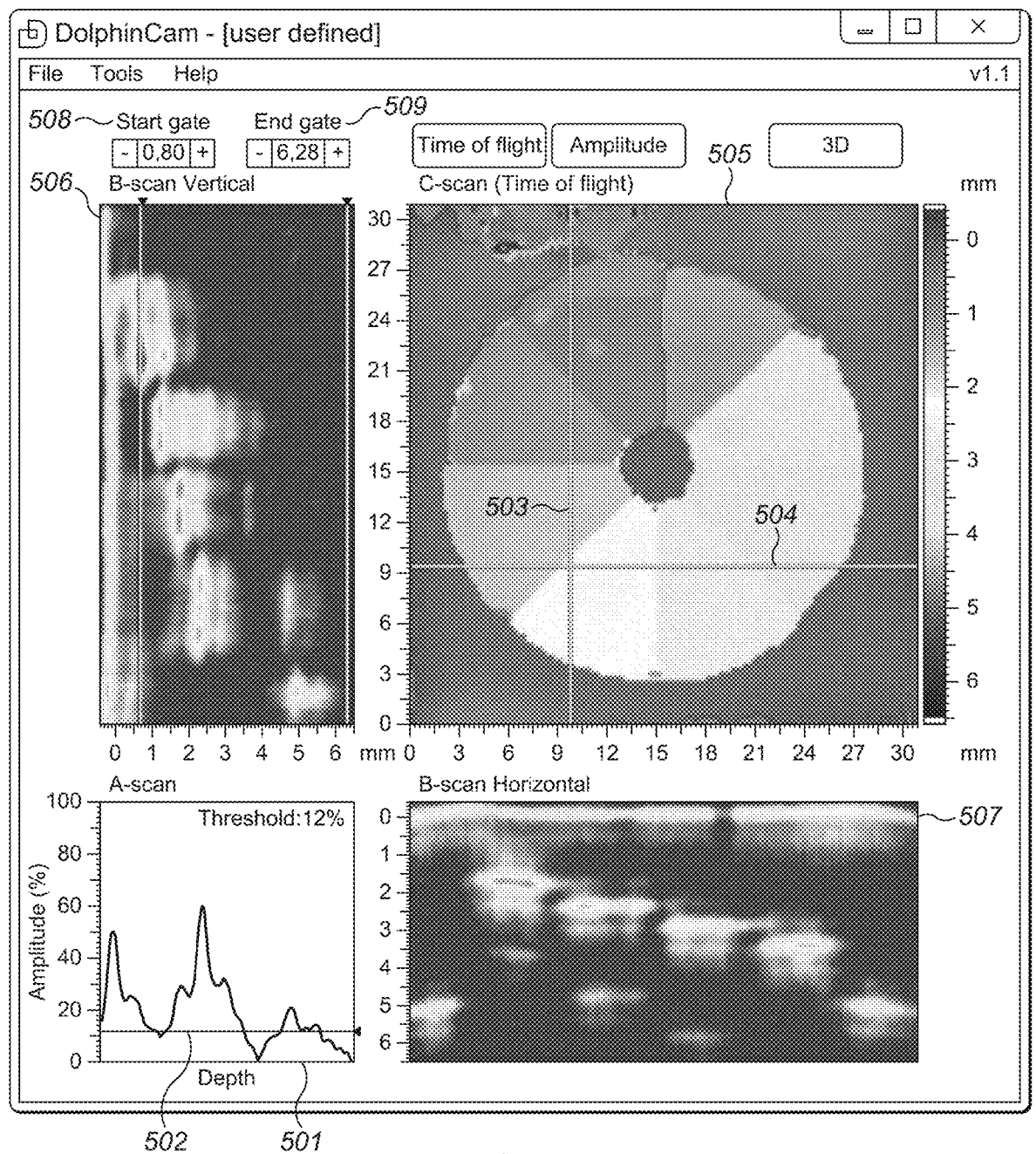
FIGS. 5a and b show example images of an object.

The image enhancement module 310 enhances the generated images to reduce noise and improve clarity. The image processing module may process the image differently depending on the type of image. (Some examples are shown in FIGS. 5a and b and described below.) The image enhancement module may perform one or more of the following:

Time Averaging. Averaging over the current and the previous frame may be performed by computing the mean of two or more successive frames for each point to reduce spurious noise.

Background compensation. The background image is acquired during calibration by transmitting a sound pulse at air. All the reflected pulse-peaks toward air are converted to the range [0, 1]. This is a digital compensation and most values will be converted to 1 or nearly 1. The ultrasound camera (e.g. the ultrasound transducer in the example of FIG. 3) inherently has some variations in performance across its surface that will affect the time and amplitude values extracted by the signal processor. To compensate for this, images obtained during normal operation are divided by the background image.

Signal envelope estimation. An analytic representation of the background compensated signal may be created as the sum of the signal itself and an imaginary unit times the Hilbert transform of the signal. The analytic signal is a complex signal, from which the signal envelope can be extracted as the magnitude of the analytic signal and used in further processing.

Generation of low-amplitude mask. This process may be used particularly for generating 3D images. A mask covering pixels that have amplitude values lower than a threshold is created. (This threshold may be lower than the threshold value for the thresholding described below.) A filter such as a 3×3 maximum filter is then used on the resulting mask to close small holes.

Thresholding: A threshold percentage can be specified so that low amplitude values do not clutter the image. In some embodiments this may be set by the operator. A threshold value is calculated from the percentage and the total range of the amplitude values. Parts the image having an amplitude value lower than this threshold are truncated and set to the threshold value. A threshold percentage of zero means that no thresholding is performed. The purpose of the thresholding is to get a cleaner visualization of the areas where the amplitude is low.

Normalization: The values are normalized to the range 0-255 to achieve good separation of colours when displayed. Normalization may be performed by percentile normalization. Under this scheme a low and a high percentile can be specified, where values belonging to the lower percentile are set to 0, values belonging to the high percentile are set to 255 and the range in between is scaled to cover [0, 255]. Another option is to set the colour focus directly by specifying two parameters, colorFocusStartFactor and colorFocusEndFactor, that define the start an end points of the range. The values below the start factor are set to 0, values above the end factor is set to 255 and the range in between is scaled to cover [0, 255].

Filtering. Images may be filtered to reduce spurious noise. Care should to be taken that the resulting smoothing does not to blur edges too much. The most appropriate filter will depend on the application. Some appropriate filter types include: mean, median, Gaussian, bilateral and maximum similarity.

Generation of colour matrix. A colour matrix is created that specifies values from the grey-level range of the colour table for low-amplitude areas and values from the colour range for the remaining, higher-amplitude areas. A mask for the grey level areas may be obtained from an eroded version of the low-amplitude mask. (The erosion will extend the mask by one pixel along the edge between grey and colour and is done to reduce the rainbow effect that the visualization would otherwise create along the edges where the pixel value goes from the grey level range to the colour range.)

Some examples of images generated by an apparatus according to one embodiment are shown in FIGS. 5a and b. The A-scan 501 is a straightforward plot of amplitude against depth for a particular location on the object's surface. Depth is calculated from the time-of-flight information. The peaks represent structural features that reflected the sound pulses. The cross hairs 503,504 designate the x,y location that is represented by the A-scan. The horizontal slidebar 502 sets the threshold percentage.

Image 505 is a two-dimensional representation of the image formed from reflections received across the matrix array. It is similar to what might be generated by a system for imaging matrix symbols. It effectively displays a sub-surface layer of the object. The example in FIG. 5a represents time-of-flight, i.e. each pixel is allocated a colour according to the relative depth associated with the largest reflection received at the corresponding location on the object's surface. Other extracted features might also be imaged, e.g. amplitude or signal energy.

The B-scan is comprised of two separate two-dimensional images that represent a vertical view (y,z) 506 and a horizontal view (x,z) 507. The vertical and horizontal views image "into" the object. The cross hairs 503, 504 determine where the "slice" through the plan view 505 is taken. These views represent the sound energy reflected at different depths in the object. The upper and lower gates 508, 509 are used to set the upper and lower bounds for time gating the incoming signals. The operator may be able to achieve a greater colour contrast between structural features of interest by adjusting the gates to focus on the depth of interest. The operator may also select only a certain depth area to inspect by adjusting the gates.

Figure 5B:
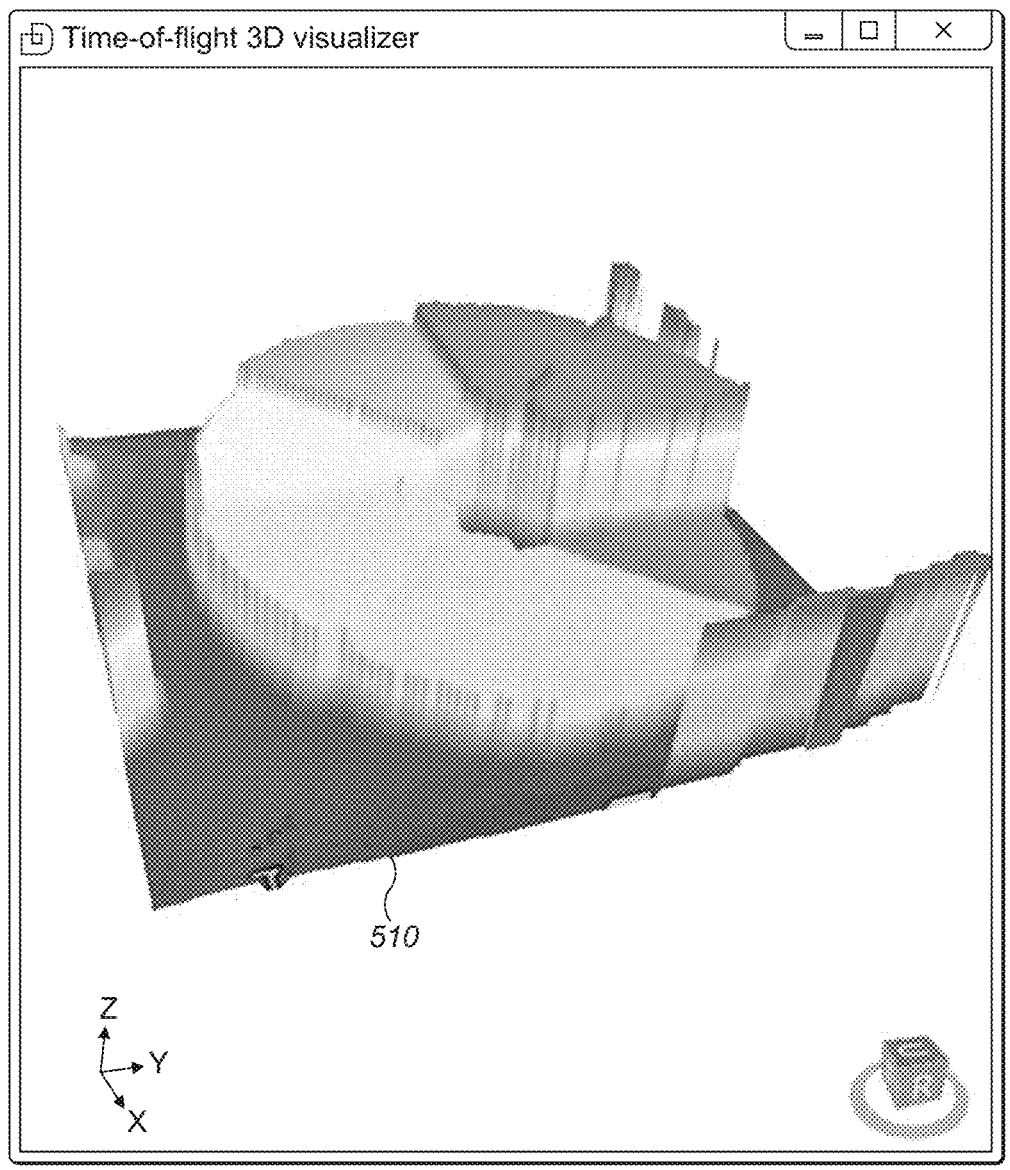

FIG. 5b shows a C-scan 510, which is 3D image. The operator may be able to rotate and zoom-in to the 3D image. The operator can select a sub-surface layer of a particular thickness to view in 3D by adjusting the time gates 508, 509.

It can be appreciated from FIGS. 5a and b that the images give the operator a good idea of the size, depth and position of any sub-surface structural features. The plan view gives the operator an overview of what is below the surface. The operator can use cross hairs 503, 504 to look at specific horizontal and vertical slices through the object. The A-scan indicates features located below a particular point on the object's surface. Finally the C-scan provides the operator with a user-friendly representation of what the object looks like below its surface.

Figure 6:
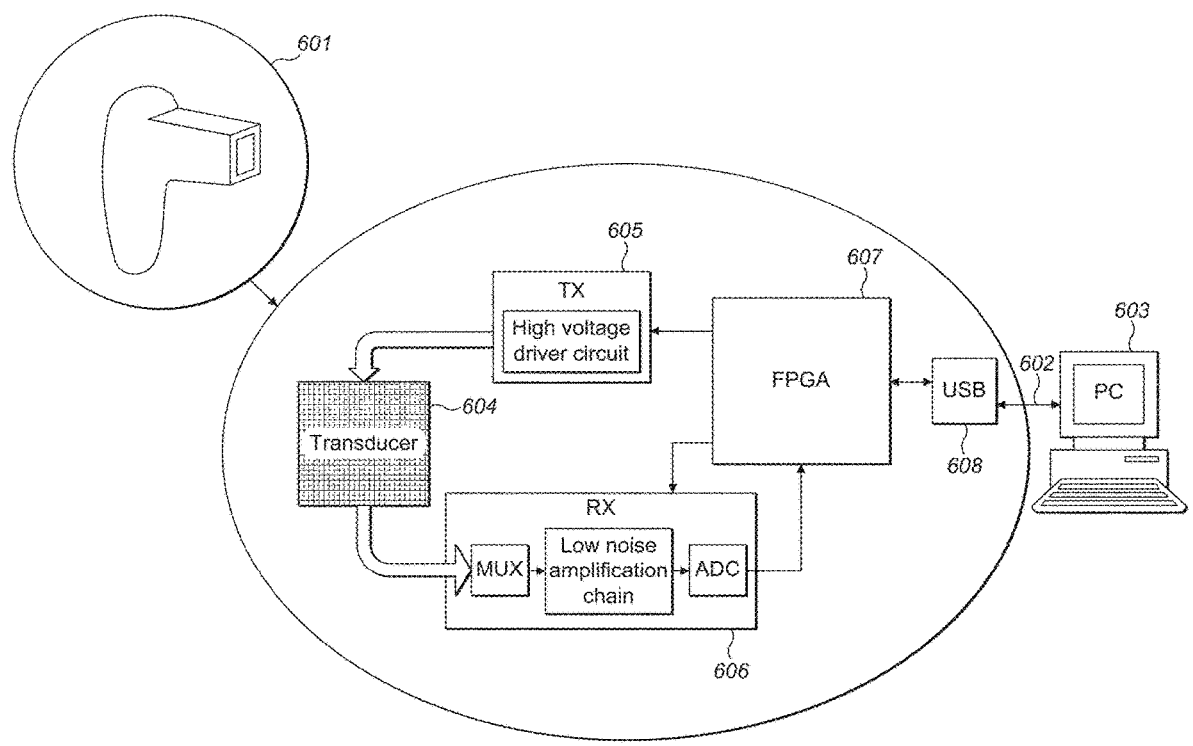
FIG. 6 shows an example of an imaging apparatus.
Figure 7:
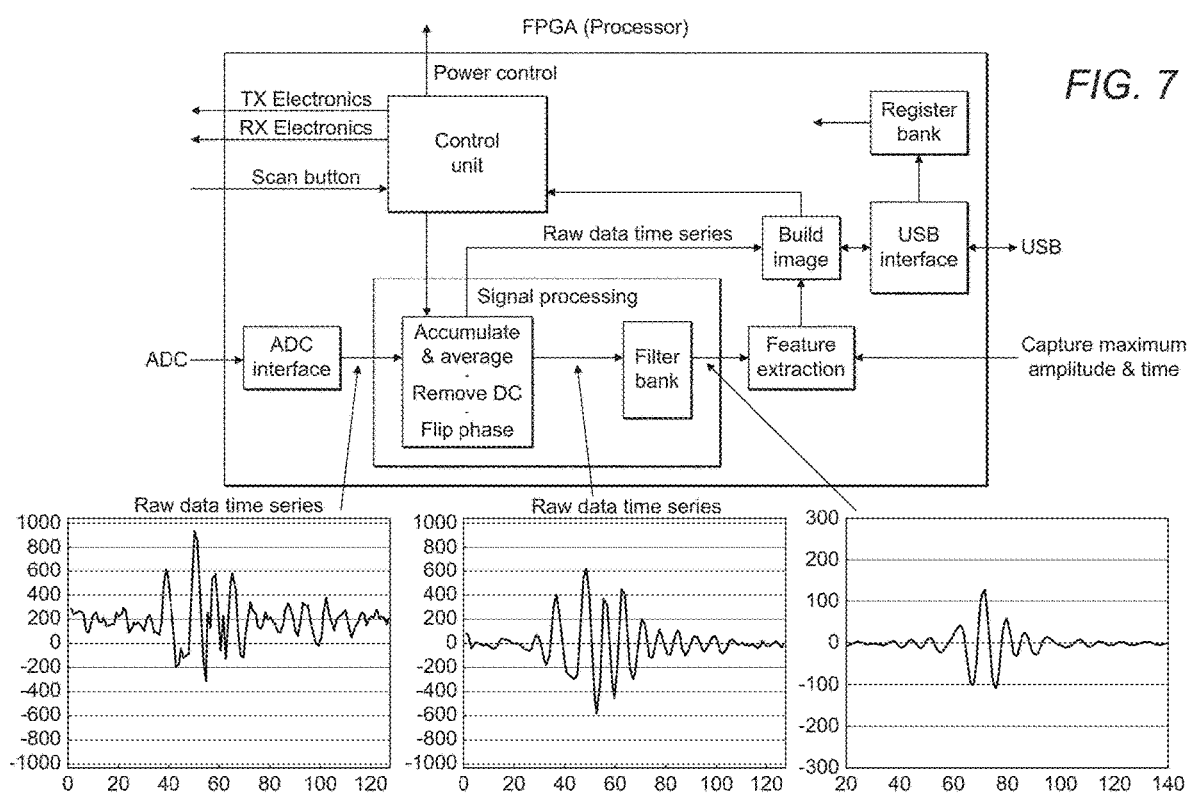
FIG. 7 shows an example of the functional blocks implemented by an FPGA.

One example of a sound imaging apparatus is illustrated in FIG. 6. The apparatus comprises a handheld device, shown generally at 601, which is connected via a USB connection 602 to a PC 603. The connection might also be wireless. The handheld device comprises a transmitter unit 605, a receiver unit 606, an FPGA 607 and a USB connector 608. The USB connection connects the handheld device to a PC 603. The functional units comprised within the FPGA are shown in more detail in FIG. 7. The time series along the bottom of the figure show the transformation of the received data as it is processed.

Figure 8:
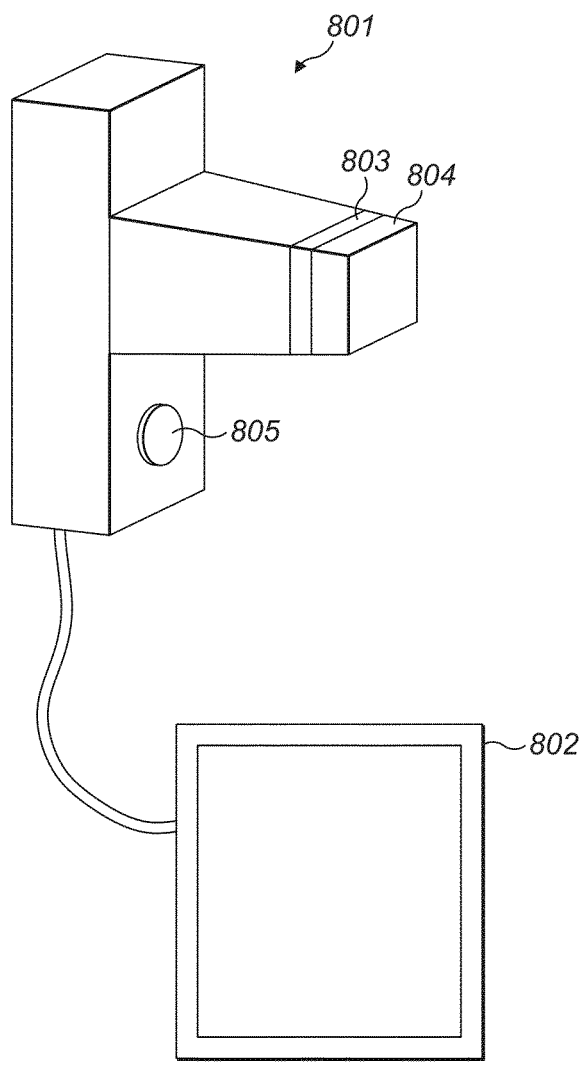
FIG. 8 shows an example of imaging apparatus.

An example of a handheld device for imaging below the surface of an object is shown in FIG. 8. The device 801 could have an integrated display, but in this example it outputs images to a tablet 802. The device has a matrix array 803 for transmitting and receiving ultrasound signals. The handheld apparatus comprises a dry coupling layer 804 for coupling ultrasound signals into the object. The dry coupling layer also introduces a delay that allows time for the transducer to switch between transmitting and receiving. This offers a number of advantages over other imaging systems, which tend to use liquids for coupling the ultrasound signals. This can be impractical in an industrial environment. If the liquid coupler is contained in a bladder, as is sometimes used, this makes it difficult to obtain accurate depth measurements which is not ideal for non-destructive testing applications.

The matrix array 803 is two dimensional so there is no need to move it across the object to obtain an image. A typical matrix array might be 30 mm by 30 mm but the size and shape of the matrix array can be varied to suit the application. The device may be straightforwardly held against the object by the operator. Commonly the operator will already have a good idea of where the object might have sub-surface flaws or material defects; for example, a component may have suffered an impact or may comprise one or more drill or rivet holes that could cause stress concentrations. The device suitably processes the reflected pulses in real time so the operator can simply place the device on any area of interest.

The handheld device also comprises a dial 805 that the operator can use to change the pulse shape and corresponding filter. The most appropriate pulse shape may depend on the type of structural feature being imaged and where it is located in the object. The operator views the object at different depths by adjusting the time-gating via the display (see also FIG. 5a, described above). Having the apparatus output to a handheld display, such as tablet 802, or to an integrated display, is advantageous because the operator can readily move the transducer over the object, or change the settings of the apparatus, depending on what he is seeing on the display and get instantaneous results. In other arrangements, the operator might have to walk between a non-handheld display (such as a PC) and the object to keep rescanning it every time a new setting or location on the object is to be tested.

Figure 9:
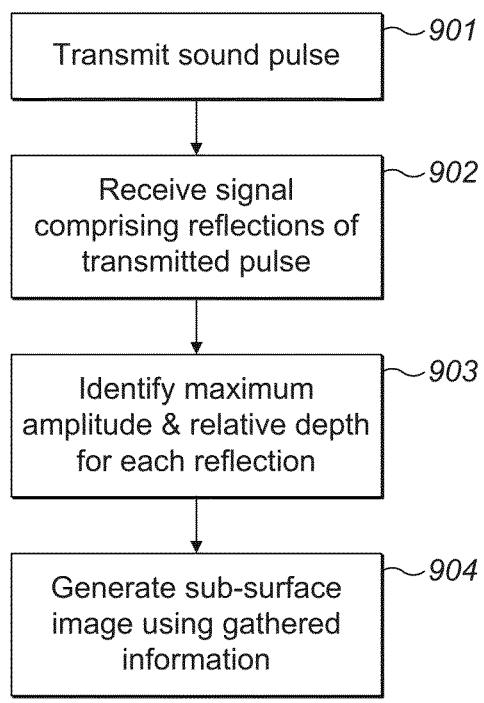
FIG. 9 shows an example of the steps involved in an imaging method.

An example of a method that may be performed to generate a sub-surface image of an object is shown in FIG. 9. The method comprises transmitting a sound pulse (step 901) and receiving reflections of that transmitted pulse (step 902). The maximum amplitude and relative depth is identified for each reflection (step 903). The gathered information is then used to generate a sub-surface image of the object (step 904).

The apparatus and methods described herein are particularly suitable for detecting debonding and delamination in composite materials such as carbon-fibre-reinforced polymer (CFRP). This is important for aircraft maintenance. It can also be used detect flaking around rivet holes, which can act as a stress concentrator. The apparatus is particularly suitable for applications where it is desired to image a small area of a much larger component. The apparatus is lightweight, portable and easy to use. It can readily carried by hand by an operator to be placed where required on the object.

The functional blocks illustrated in the figures represent the different functions that the apparatus is configured to perform; they are not intended to define a strict division between physical components in the apparatus. The performance of some functions may be split across a number of different physical components. One particular component may perform a number of different functions. The functions may be performed in hardware or software or a combination of the two. The apparatus may comprise only one physical device or it may comprise a number of separate devices. For example, some of the signal processing and image generation may be performed in a portable, hand-held device and some may be performed in a separate device such as a PC, PDA, phone or tablet. In some examples, the entirety of the image generation may be performed in a separate device.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An apparatus for imaging structural features below a surface of an object, the apparatus comprising:
   a pulse generation unit configured to form a pulse having a particular shape for transmission as a sound pulse, where the shape of the pulse is selected in dependence on at least one of a type of structural feature to be imaged, a depth of the structural feature to be imaged and a material type of the object;
   a transmitter unit configured to transmit the sound pulse at the object;
   a receiver unit configured to receive, from the object, a signal that includes representations of reflections of the sound pulse transmitted by the transmitter unit;
   a signal processing unit comprising a match filter configured to identify a pulse having the particular shape in the received signal, the signal processing unit being configured to: analyse the signal received by the receiver unit; identify, in the signal, a representation of a reflection that was caused by a first structural feature in the object and a representation of a reflection that was caused by a second structural feature in the object that is located at least partly behind the first structural feature; and determine, for each of the identified reflections, a relative depth in the object at which the identified reflection occurred; and
   an image generation unit configured to generate an image that includes a representation of the first and second structural features in dependence on the identified reflections and their relative depths,
   the apparatus being configured to determine an optimum pulse shape by obtaining a reflection of each transmitted pulse against a particular material, filtering the reflections using the match filter and determining performance according to one or more of: the difference of the main lobe and side lobe amplitudes normalized with a root-mean-square of the matched filter coefficients, the variance of an estimated time-of-flight, and the main lobe amplitude divided by the average amplitude of all side lobes.

2. An apparatus as claimed in claim 1, the shape of the pulse being selected so as to optimise information that can be gathered by the signal processing unit or improved by an image enhancement module.

3. An apparatus as claimed in claim 1, the apparatus being configured to select the pulse shape and corresponding match filter so as to obtain an estimate of the time-of-flight of at least one of the identified reflections to indicate the depth of the structural feature at which the at least one of the identified reflections occurred.

4. An apparatus as claimed in claim 1, the apparatus having a plurality of particular pulse shapes available to it, the pulse generation unit being configured to assess an available pulse shape against a performance criterion and select the available pulse shape as a candidate for transmission in dependence on the assessment.

5. An apparatus as claimed in claim 1, wherein the apparatus is configured such that the particular shape is selectable by the user.

6. An apparatus as claimed in claim 1, wherein the signal received by the receiver unit includes representations of multiple reflections of a single sound pulse transmitted by the transmitter unit; and wherein the receiver unit is configured to receive the signal that includes the representations of the multiple reflections while the receiver unit is in a stationary position with respect to the object.

7. An apparatus as claimed in claim 6, wherein the apparatus is configured to gate the signal received by the receiver unit in such a way that the signal passed to the signal processing unit for analysis comprises the multiple reflections.

8. An apparatus as claimed in claim 1, wherein the apparatus is configured to apply an adjustable time-gate to the received signal.

9. An apparatus as claimed in claim 1, wherein the signal processing unit is configured to determine, for each identified representation of a reflection, a relative depth that is determined in dependence on a time that the identified reflection took to travel from the structural feature that caused the reflection to the receiver unit.

10. An apparatus as claimed in claim 1, wherein the signal processing unit is configured to determine, for each identified representation of a reflection, a maximum amplitude and to adjust the maximum amplitude in dependence on the relative depth determined for the respective reflection.

11. An apparatus as claimed in claim 1, wherein the transmitter unit is configured to transmit a series of sound pulses into the object and the image generation unit is configured to generate, for each sound pulse in the series, an image in dependence on reflections of the respective sound pulse that are identified by the signal processing unit.

12. An apparatus as claimed in claim 1, wherein the image generation unit is configured to generate an image in which the first and second structural features are represented at positions in the image that reflect the relative depths at which the corresponding reflections occurred below the surface of the object.

13. An apparatus as claimed in claim 1, the apparatus further comprising a handheld device that comprises at least the transmitter unit and the receiver unit.

14. An apparatus as claimed in claim 1, wherein the apparatus is configured to at least one of: display the image on an integrated display of the apparatus, and output the image to a handheld display device.

15. An apparatus as claimed in claim 1, wherein the image generation unit is configured to:
identify a reflection having a maximum amplitude that is below a threshold value; and
assign a pixel in the image that corresponds to the identified reflection a predetermined value instead of the maximum amplitude of the reflection.

16. An apparatus as claimed in claim 1, the apparatus further comprising a dry coupling medium.

17. An apparatus for imaging structural features below a surface of an object, the apparatus comprising:

a pulse generation unit configured to form a pulse having a particular shape for transmission as a sound pulse, where the shape of the pulse is selected in dependence on at least one of a type of structural feature to be imaged, a depth of the structural feature to be imaged and a material type of the object;
a matrix array configured to:
transmit the sound pulse at the object; and
receive, from the object, a signal that includes representations of reflections of the transmitted sound pulse;
a signal processing unit comprising a match filter configured to identify a pulse having the particular shape in the received signal, the signal processing unit being configured to: analyse the signal received by the matrix array; identify, in the signal, a representation of a reflection that was caused by a first structural feature in the object and a representation of a reflection that was caused by a second structural feature in the object that is located at least partly behind the first structural feature; and determine, for each of the identified reflections, a relative depth in the object at which the identified reflection occurred; and
an image generation unit configured to generate an image that includes a representation of the first and second structural features in dependence on the identified reflections and their relative depths,
the apparatus being configured to determine an optimum pulse shape by obtaining a reflection of each transmitted pulse against a particular material, filtering the reflections using the match filter and determining performance according to one or more of: the difference of the main lobe and side lobe amplitudes normalized with a root-mean-square of the matched filter coefficients, the variance of an estimated time-of-flight, and the main lobe amplitude divided by the average amplitude of all side lobes.

18. A method for imaging structural features below a surface of an object comprising:
selecting a pulse having a particular shape for transmission as a sound pulse, the shape being selected in dependence on at least one of a type of structural feature to be imaged, a depth of the structural feature to be imaged and a material type of the object;
transmitting the sound pulse at the object;
receiving, from the object, a signal that includes representations of reflections of the sound pulse transmitted at the object;
identifying, in the signal received from the object, a representation of a reflection that was caused by a first structural feature in the object and a representation of a reflection that was caused by a second structural feature in the object that is located at least partly behind the first structural feature;
determining, for each of the identified reflections, a relative depth in the object at which the identified reflection occurred; and
generating an image that includes a representation of the first and second structural features in dependence on the identified reflections and their relative depths,
the method further comprising determining an optimum pulse shape by obtaining a reflection of each transmitted pulse against a particular material, filtering the reflections using a match filter and determining performance according to one or more of: the difference of the main lobe and side lobe amplitudes normalized with a root-mean-square of the matched filter coefficients, the variance of an estimated time-of-flight, and the main lobe amplitude divided by the average amplitude of all side lobes.

* * * * *